US008121595B2

(12) United States Patent
Stephens et al.

(10) Patent No.: US 8,121,595 B2
(45) Date of Patent: Feb. 21, 2012

(54) ADAPTIVE POLLING OF WIRELESS DEVICES

(75) Inventors: Adrian P. Stephens, Cottenham (GB); Dmitry Akhmetov, Dzerzhinsk (RU)

(73) Assignee: Intel Corporation, Santa Clara, CA (US)

( * ) Notice: Subject to any disclaimer, the term of this patent is extended or adjusted under 35 U.S.C. 154(b) by 1859 days.

(21) Appl. No.: 10/860,343

(22) Filed: Jun. 2, 2004

(65) Prior Publication Data

US 2005/0272423 A1 Dec. 8, 2005

(51) Int. Cl.
*H04W 4/00* (2009.01)

(52) U.S. Cl. ............ 455/434; 455/67.11; 455/515; 455/516; 455/410; 455/415; 455/507; 370/229; 370/239; 370/252; 370/449; 370/457; 709/223; 709/224; 710/46; 710/57

(58) Field of Classification Search .......... 455/507, 455/67, 11, 515–516, 450–455, 410–415; 370/449–457, 252, 229–234; 709/223–224; 710/46, 57

See application file for complete search history.

(56) References Cited

U.S. PATENT DOCUMENTS

| | | | | |
|---|---|---|---|---|
| 4,598,363 A * | 7/1986 | Clark et al. | ...... | 710/46 |
| 5,633,859 A * | 5/1997 | Jain et al. | ...... | 370/234 |
| 5,657,326 A * | 8/1997 | Burns et al. | ...... | 370/349 |
| 5,659,787 A * | 8/1997 | Schieltz | ...... | 709/226 |
| 5,896,561 A * | 4/1999 | Schrader et al. | ...... | 455/67.11 |
| 5,922,051 A * | 7/1999 | Sidey | ...... | 709/223 |
| 6,049,549 A | 4/2000 | Ganz et al. | | |
| 6,173,323 B1 * | 1/2001 | Moghe | ...... | 709/224 |
| 6,185,421 B1 * | 2/2001 | Alperovich et al. | ...... | 455/433 |
| 6,563,427 B2 * | 5/2003 | Bero et al. | ...... | 340/573.1 |
| 6,640,268 B1 | 10/2003 | Kumar | | |
| 6,898,751 B2 * | 5/2005 | Aikawa et al. | ...... | 714/748 |
| 6,931,460 B2 * | 8/2005 | Barrett | ...... | 710/57 |
| 2002/0131372 A1* | 9/2002 | Rinchiuso | ...... | 370/252 |
| 2003/0140092 A1* | 7/2003 | Caruso et al. | ...... | 709/203 |

FOREIGN PATENT DOCUMENTS

| | | |
|---|---|---|
| CN | 101120538 A | 2/2008 |
| EP | 1117211 | 7/2001 |
| EP | 1465371 | 10/2004 |

OTHER PUBLICATIONS

PCT/US2005/016829—PCT International Search Report and Written Opinion Mailed Aug. 17, 2005.
Office Action Received for Chinese Patent Application No. 200580017712.3, mailed on Nov. 7, 2008, 14 pages of Chinese office Action and 6 pages of English Translation.
Office Action Received for Chinese Patent Application No. 200580017712.3, mailed on Aug. 3, 2010, 8 pages of Chinese office Action 23 pages of English Translation.

* cited by examiner

*Primary Examiner* — Steve D Agosta
(74) *Attorney, Agent, or Firm* — Cool Patent, P.C.

(57) ABSTRACT

In a wireless network, the decision of when and whether to send unsolicited polls to a particular mobile wireless device may be made by monitoring communications conditions affecting the ability of the particular device to gain channel access, and sending unsolicited polls if the ability to gain channel access is below a threshold value. Such conditions may include one or more of channel load, device transmission load, collision rate, and number of mobile wireless devices contending for access.

17 Claims, 4 Drawing Sheets

ADAPTIVE POLLING OF WIRELESS DEVICES

BACKGROUND

In a wireless local area network (WLAN), there are generally two network mechanisms that allow wireless devices to get channel access: distributed and centrally-coordinated. In the distributed mechanism, each mobile wireless device (STA) may try to transmit when it thinks the channel is going to be free, but sometimes multiple STAs transmit at the same time and thereby interfere with each other, causing a need for retries. In the centrally-coordinated mechanism, a coordinating device, such as an access point (AP), may poll each STA in turn, giving the polled STA exclusive use of the channel for a while. This may prevent collisions and retries by allowing only one STA to transmit at a time, but some STAs may experience communication delays because they have to wait while the AP is polling other STAs that have nothing to transmit.

Rather than waiting for its turn to be polled, a STA with data to transmit may send a short request to the central coordinator that the STA be polled for one or more longer-duration transmissions. Alternately, the central coordinator may send out unsolicited polls to one or more STAs. Which of the methods (contention for the channel, unsolicited polls, or solicitations to be polled) provides the best overall channel throughput may depend on various things such as channel conditions, which may change dynamically with time. Conventional networks may send out unsolicited polls on a fixed schedule, a technique that responsive to changing channel conditions.

BRIEF DESCRIPTION OF THE DRAWINGS

The invention may be understood by referring to the following description and accompanying drawings that are used to illustrate embodiments of the invention. In the drawings.

DETAILED DESCRIPTION OF THE INVENTION

Figure 1:
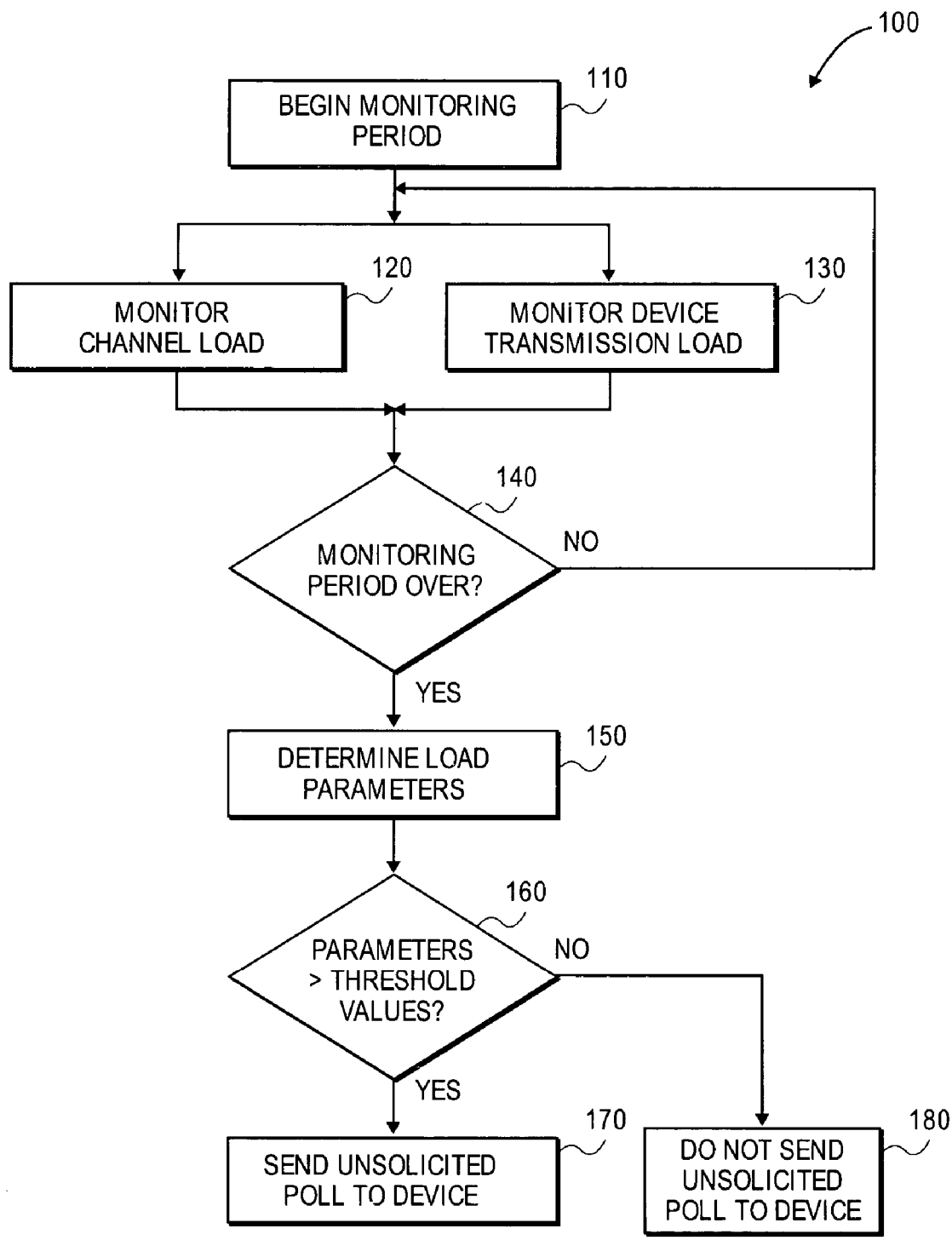
FIG. 1 shows a flow chart of a method of determining whether to send unsolicited polls, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in an embodiment" does not necessarily refer to the same embodiment, although it may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the context of this document, the term "wireless" and its derivatives may be used to describe circuits, devices, systems, methods, techniques, communications channels, etc., that may communicate data through the use of modulated electromagnetic radiation at least partially through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive those signals, etc.), and others.

In keeping with common industry terminology, the terms "base station", "access point", and "AP" may be used interchangeably herein to describe an electronic device that may communicate wirelessly with multiple other electronic devices, while the terms "mobile wireless device" and "STA" may be used interchangeably to describe any of those multiple other electronic devices, which may have the capability to be moved and still communicate with the AP, though movement is not a requirement. However, the scope of the invention is not limited to devices that are labeled with these terms.

Various embodiments of the invention may generate unsolicited polls to STAs at least partly on the basis of some indication of the observed communications load. Such observed communications load may include one or more of such things as channel load, device transmission load, collision rate, and/or contention for channel access. Such observations may be based on actual transmissions and/or on indicator(s) of the data queued up for transmission.

FIG. 1 shows a flow chart of a method of determining whether to send unsolicited polls, according to an embodiment of the invention. Flow chart 100 begins at 110 with a monitoring period, during which one or more indicators of channel availability may be monitored. Channel availability may indicate how easily a given device (such as a mobile wireless device) is likely to be able to acquire access to the channel for transmission. The monitoring period may be scheduled in various ways, such as but not limited to: 1) at regular intervals, 2) at irregular intervals based on detection of some triggering event or condition, 3) a continuously rolling period, 4) in other ways not specifically listed here. As indicated at 120, the monitoring may include monitoring channel load (e.g., the fraction of time the channel is busy as measured over a period of time). The precise definition of 'channel' may vary depending on the type of transmission technology being used, such as but not limited to frequency division multiple access (FDMA), code division multiple access (CDMA), spatial division multiple access (SDMA), orthogonal frequency division multiplexing (OFDM), and any combination of multiple techniques, but in general two devices transmitting at the same time whose signals interfere with one another sufficiently to impair usable reception may be considered to be on the same channel.

When a channel is busy may be determined in various ways, such as directly by detecting a carrier signal on the channel, indirectly by getting an indication of the amount of data in the transmit queues of devices that use the channel and calculating what percentage of time the channel is estimated to be busy based on the data in these queues, or by a combination of these and/or other techniques. Transmit queues may comprise data that is temporarily stored while awaiting transmission, and/or the location at which that data is temporarily stored. Transmit queues may be implemented through software, memory locations, hardware buffers, and/or any other feasible means. A given device may have one or more transmit queues, and the use of the plural term "queues" herein is also intended to cover instances in which only one queue is used.

At 130, the transmission load of a particular mobile wireless device may be monitored to determine how much access the particular mobile wireless device needs to the channel. The device transmission load may be determined in various ways, such as directly by monitoring the transmissions from that device, indirectly by examining the transmit queue(s) of that device and calculating how much access to the channel that the device may need, or by a combination of these and/or other techniques. In the illustrated embodiment of FIG. 1 the channel load and device transmission load may be monitored concurrently so that the resultant determinations will be for approximately the same time period, but other embodiments may use other techniques, such as but not limited to monitoring channel load and device transmission load at separate times.

Such monitoring may continue until the monitoring time period is determined to be over at 140. As implied above, the monitoring period for channel load and the monitoring period for device transmission load may be separate and may not begin or end at the same time. After the monitoring period is over, the values for the specific load parameters may be determined at 150. Such load parameters may include any or all of, but are not limited to, a parameter for channel load, a parameter for device transmission load, and a composite parameter combining channel load and device transmission load in a predetermined manner. One or more of the parameters may be compared against one or more threshold values at 160 to device whether conditions justify sending unsolicited polls to the particular mobile wireless device mentioned above.

Depending on the results of the comparison(s) at 160, one or more unsolicited polls may be sent to the particular mobile wireless device at 170, or such polls may not be sent to the particular mobile wireless device at 180. In some embodiments, the unsolicited polls may be sent if both of the following two conditions are true, while in other embodiment the unsolicited polls may be sent if either of these conditions is true: 1) the channel load parameter is greater than the associated channel load threshold value, indicating that the channel is so busy that the particular mobile wireless device may have trouble gaining access to the channel as often as it needs, and 2) the device transmission load parameter for the particular mobile wireless device is greater than the associated device transmission load threshold value, indicating the particular mobile wireless device has so much data to send that it may not me able to send the data in a timely manner unless it is given dedicated channel access by being polled. If either or both of the conditions is not true (depending on the embodiment), unsolicited polls may not be sent at that time, based on a determination that the particular mobile wireless device does not need channel access sufficiently to justify giving it immediate exclusive access by means of an unsolicited poll. While specific conditions have been listed herein as criteria for the decision, it is understood that in some embodiments, other conditions not listed here may override the decisions described.

In other embodiments, the channel load and device transmission load may be merged into a single combined parameter, and that combined parameter compared with a threshold value to determine whether or not to send unsolicited polls. The combined parameter may be created from the individual parameters through various techniques, such as but not limited to: 1) adding the individual parameters, 2) adding weighed values of the individual parameters, 3) multiplying the individual parameters, 4) multiplying weighted values of the individual parameters, 5) a combination of these or other techniques, 6), etc.

Although the comparison operations described herein may refer to a monitored value being 'greater than' or 'less than' the threshold value, it is understood that other mathematical techniques may be used that would reverse the 'greater than'/ 'less than' relationship, or that would include 'equal to' on either side of the decision point. Such differences amount to minor variations that would be obvious to a person of ordinary skill in the art and are considered to be within the scope of the various embodiments of the invention.

Figure 2:
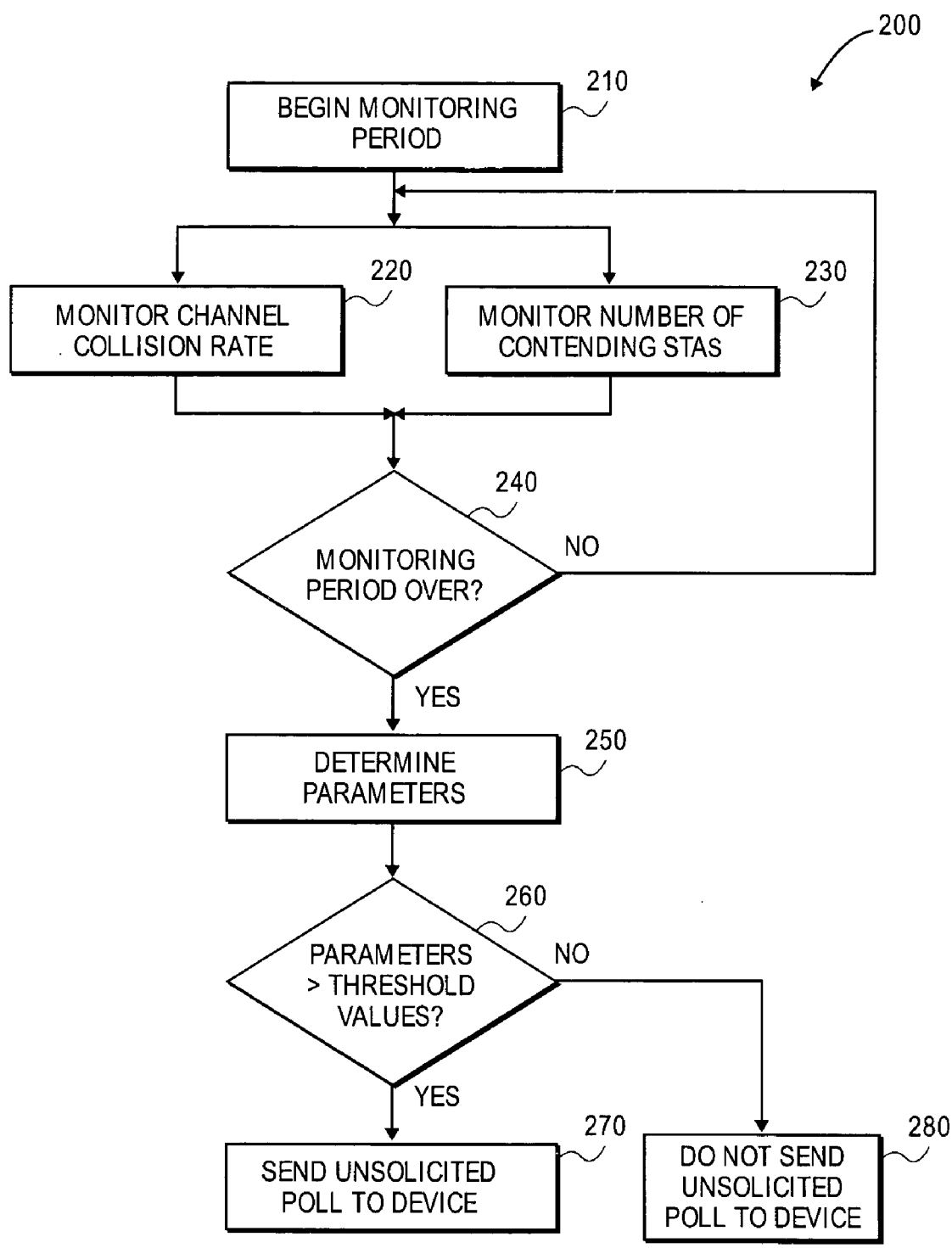
FIG. 2 shows a flow chart of a method of determining whether to send unsolicited polls, according to another embodiment of the invention.

FIG. 2 shows a flow chart of a method of determining whether to send unsolicited polls, according to another embodiment of the invention. Flow chart 200 is similar to flow chart 100, except that channel collision rate is monitored at 220 instead of channel load, and the number of contending mobile wireless devices is monitored at 230 instead of device transmission load. Except for the substitution of these two parameters, the description of FIG. 2 is similar to the description of FIG. 1, with designators 2xx substituting for designators 1xx, and the description is therefore not repeated here.

Although FIG. 1 shows two particular criteria being used in the decision of whether to send unsolicited polls, and FIG. 2 shows two other criteria, it should be noted that in some embodiments any of the four indicated criteria may be used either singly or in any combination to determine whether to send unsolicited polls.

A collision occurs when two or more devices attempt to transmit at the same time and the resulting combination of their signals prevents at least one of them from being accurately received by the intended receiver. Such collisions may usually be inferred when a transmission is strong enough to be received correctly but is corrupted such that it cannot be reconstructed at the receiving device. Since such collisions will presumably not occur if the two devices are transmitting on different channels, the channel collision rate may only be concerned with collisions on the particular channel being used. If the collision rate is high, that may indicate that too many devices are contending for channel access and that the contention should be reduced or eliminated by polling devices individually to give them exclusive use of the channel for a limited time. In some embodiments a single device, such as but not limited to a base station, may determine the collision rate by monitoring all transmissions on the channel and determining how many of those transmissions have been corrupted. In other embodiments, multiple devices may monitor for collisions and the collision statistics may be periodically collected from those devices and combined to produce a channel collision rate. In still other embodiments, each device may monitor only its own collision rate, and may report that collision rate to a central collection point, such as the AP, if that collision rate exceeds a certain level.

The number of mobile wireless devices contending for access to the channel, as indicated at 230, may be determined in various ways. In some embodiments, the AP may keep track of the number of mobile wireless devices that transmit data on the channel and/or request the AP to grant them access to the channel during the monitoring period. It may also be inferred by using the amount of data in the transmit queues of the mobile wireless devices to estimate how many devices are anticipated to contend for channel access during a particular period of time. The amount of data in a mobile wireless device's transmit queues may learned by the AP in various ways, such as but not limited to: 1) the mobile wireless device may include an indication of the amount of data remaining in its queues in a message to the AP, 2) the AP may estimate the amount of data based on the content of messages being sent to the mobile wireless device, 3) etc.

Figure 3:
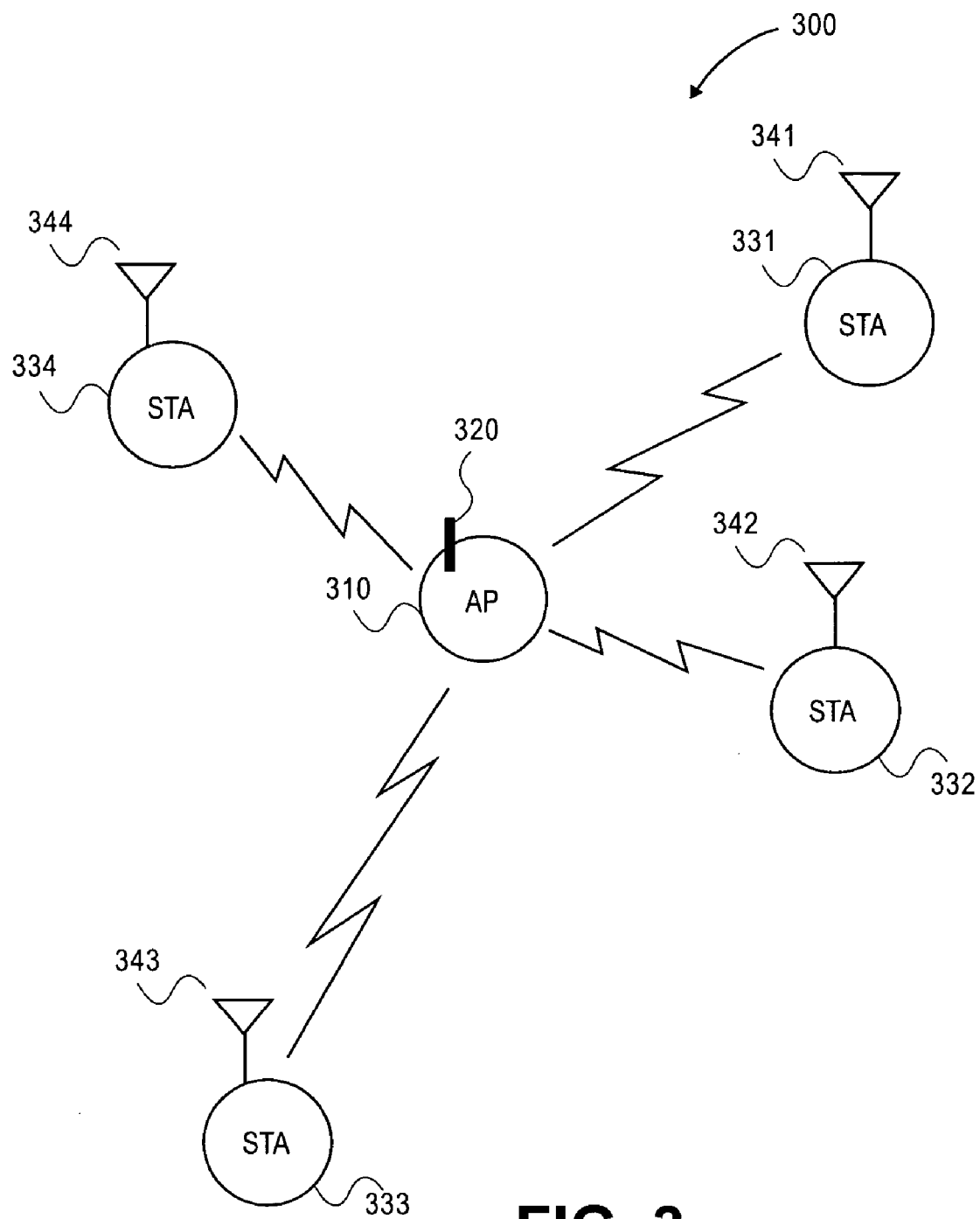
FIG. 3 shows a diagram of a wireless network in which unsolicited polls may be issued, according to an embodiment of the invention.

FIG. 3 shows a diagram of a wireless network in which unsolicited polls may be issued, according to an embodiment of the invention. In the illustrated network 300, an AP 310 may communicate with multiple mobile wireless devices 331, 332, 333 and 334. Each device is shown with an antenna (320 for the AP and 341-344 for the STAs) through which the device may transmit and receive signals according to the protocols of the communications technology being used. The AP may receive and/or otherwise monitor signals transmitted by each of the STAs and may transmit to each of the STAs, while each of the STAs may receive and/or monitor signals from the AP. In some embodiments at least one STA may monitor or otherwise communication directly with another STA, although the invention is not limited in this respect. Although only one antenna is shown per device, some or all of the devices may have more than one antenna. Each antenna may be of various types, such as but not limited to a dipole antenna and/or an omni-directional antenna.

Figure 4:
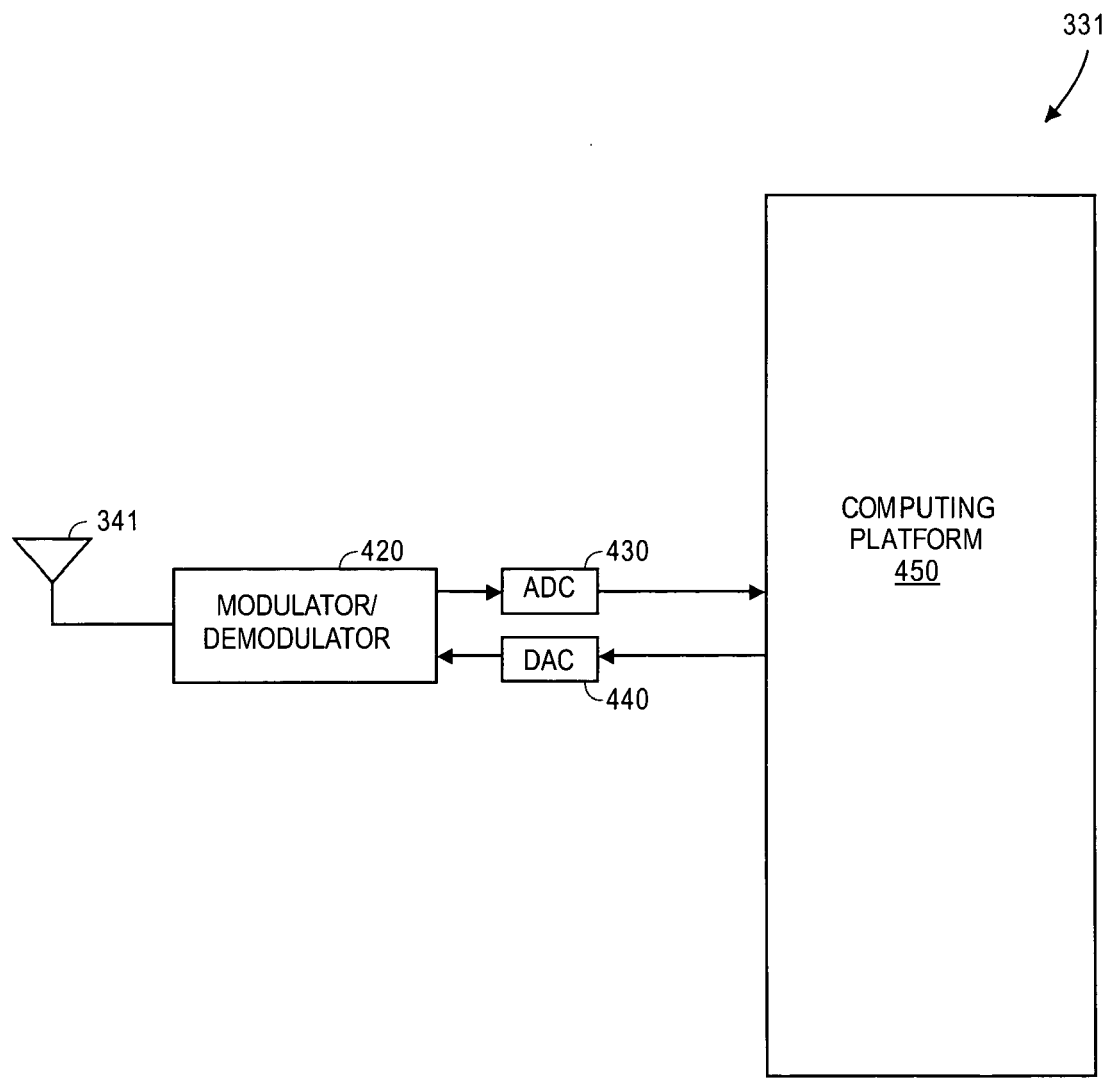
FIG. 4 shows a wireless device, according to an embodiment of the invention.

FIG. 4 shows a wireless device, according to an embodiment of the invention. Although the wireless device and its antenna are labeled 331 and 341, corresponding with an exemplary STA in FIG. 3, the drawing may also illustrate the components of an AP. In the illustrated embodiment of FIG. 4, computing platform 450 may be coupled to antenna 341 through modulator/demodulator 420, analog to digital converter (ADC) 430, and digital to analog converter (DAC) 440. The ADC and DAC may convert signals between analog and digital formats, while the modulator/demodulator may convert between the analog signals and a high frequency signal suitable for wireless communications. Other components not shown may also be included.

The foregoing description is intended to be illustrative and not limiting. Variations will occur to those of skill in the art. Those variations are intended to be included in the various embodiments of the invention, which are limited only by the spirit and scope of the appended claims.

What is claimed is:

1. A method, comprising:

monitoring a wireless channel to determine a fraction of time the channel is busy;

comparing the fraction with a value; and transmitting an unsolicited poll to a mobile wireless device resultant to the fraction being greater than the value, but not transmitting the unsolicited poll to the mobile wireless device resultant to the fraction being less than the value.

2. The method of claim 1, wherein said monitoring comprises monitoring transmitted signals on the channel.

3. An article comprising a machine-readable medium that provides instructions, which when executed by a computing platform, cause said computing platform to perform operations comprising:

monitoring a wireless channel to determine a fraction of time the channel is busy;

comparing the fraction with a value; and transmitting an unsolicited poll to a mobile wireless device resultant to the fraction being greater than the value, but not transmitting the unsolicited poll to the mobile wireless device resultant to the fraction being less than the value.

4. The article of claim 3, wherein said monitoring comprises monitoring transmitted signals on the channel.

5. The article of claim 3, wherein said monitoring comprises monitoring transmit queues.

6. An apparatus comprising a wireless device to:

monitor at least one indicator of channel availability for a particular mobile wireless device;

determine at least one parameter based on said monitoring;

compare said at least one parameter with at least one threshold value; and transmit an unsolicited poll to the particular mobile wireless device resultant to the comparison indicating that channel availability is less than a predetermined level of channel availability, but not transmit the unsolicited poll to the particular mobile wireless device resultant to the comparison indicting that the channel availability is not less than the predetermined level of channel availability.

7. The apparatus of claim 6, wherein the at least one indicator includes at least one indicator selected from a list consisting of:
- a channel load indicator;
- a device transmission load indicator;
- a channel collision rate indicator; and
- a device contention indicator.

8. The apparatus of claim 6, wherein said monitoring comprises monitoring transmitted signals on the channel.

9. The apparatus of claim 6, wherein said monitoring comprises monitoring at least one transmit queue.

10. The apparatus of claim 6, wherein said wireless device is a base station.

11. The apparatus of claim 6, wherein said wireless device is a device selected from a list consisting of:
- the particular mobile wireless device; and
- a mobile wireless device other than the particular mobile wireless device.

12. A system comprising
a wireless device comprising an omni-directional antenna, the wireless device to:
- monitor at least one indicator of channel availability for a particular mobile wireless device;
- determine at least one parameter based on said monitoring;
- compare said at least one parameter with at least one threshold value; and
- transmit an unsolicited poll to the particular mobile wireless device resultant to the comparison indicating that channel availability is less than a predetermined level of channel availability, but not transmit the unsolicited poll to the particular mobile wireless device resultant to the comparison indicting that the channel availability is not less than the predetermined level of channel availability.

13. The system of claim 12, wherein the at least one indicator includes at least one indicator selected from a list consisting of:
- a channel load indicator;
- a device transmission load indicator;
- a channel collision rate indicator; and
- a device contention indicator.

14. The system of claim 12, wherein said monitoring comprises monitoring transmitted signals on the channel.

15. The system of claim 12, wherein said monitoring comprises monitoring at least one transmit queue.

16. The system of claim 12, wherein said wireless device is a base station.

17. The system of claim 12, wherein said wireless device is a device selected from a list consisting of:
- the particular mobile wireless device; and
- a mobile wireless device other than the particular mobile wireless device.

* * * * *